Oct. 6, 1931.    H. A. GREENWALD    1,826,172
POWER TRANSMITTING DEVICE
Filed Sept. 8, 1930
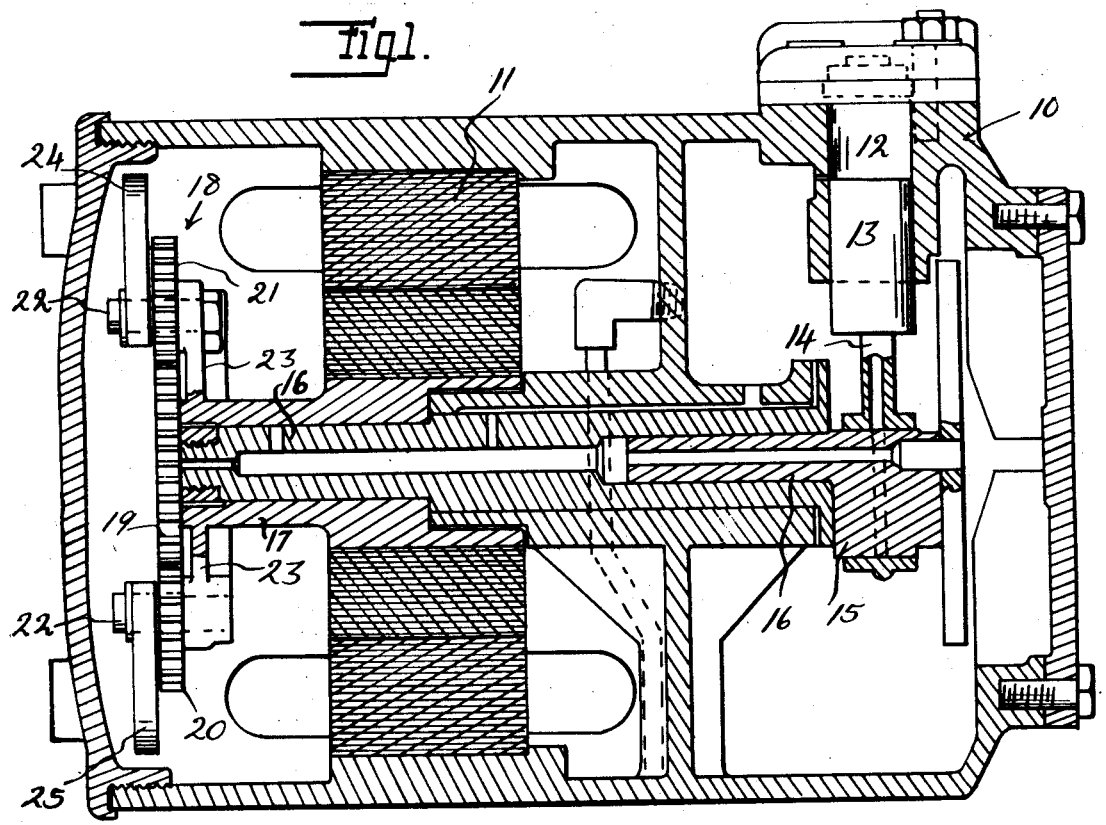
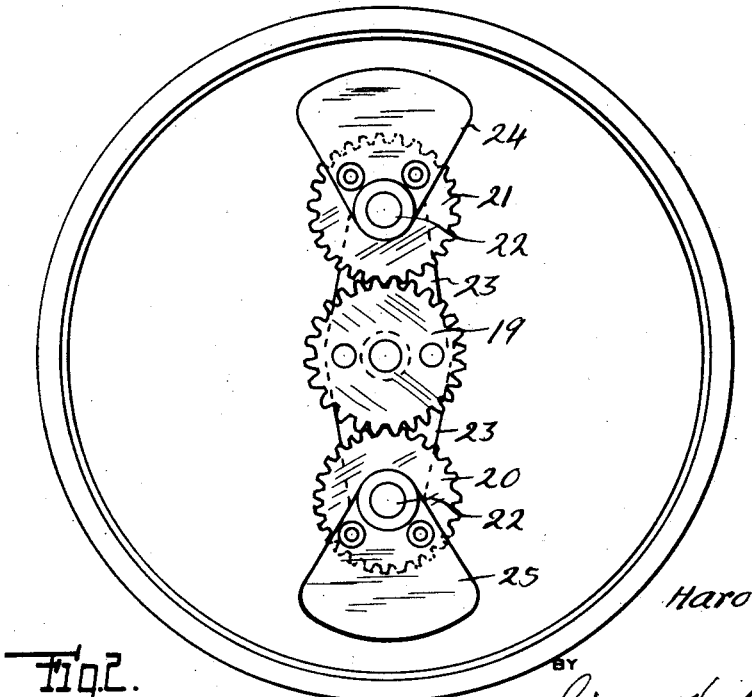
INVENTOR
Harold A. Greenwald
ATTORNEYS Patented Oct. 6, 1931

1,826,172

UNITED STATES PATENT OFFICE

HAROLD A. GREENWALD, OF DETROIT, MICHIGAN, ASSIGNOR TO THOMAS C. WHITEHEAD, OF DETROIT, MICHIGAN

POWER TRANSMITTING DEVICE

Application filed September 8, 1930. Serial No. 480,561.

This invention relates to power transmitting devices and contemplates the provision of mechanism automatically operable to drive a driven element from a suitable prime mover at varying speeds from zero to maximum, depending upon the load. One of the principal objects of the present invention is to provide a power transmitting device for automatically and gradually applying the load to a prime mover after the latter substantially reaches or approaches maximum speed, thereby permitting the use of prime movers having a relatively low starting torque.

Another object of this invention is to provide mechanism of the type specified above operable to drive the driven element at a substantially constant speed after the inertia and static friction of the mechanism have been overcome and, of course, the load itself started and driven, irrespective of slight variations in the load, or variations caused by vibrations.

The foregoing, as well as other objects, will be made more apparent as this description proceeds, especially when considered in connection with the accompanying drawings, wherein:

Figure 1 is a central sectional view through a refrigerating unit equipped with one form of power transmitting device;

Figure 2 is an end elevation of the construction shown in Figure 1 with the cover removed.

While the invention is capable of many and diversified uses, nevertheless, for the purpose of illustration, I have shown the same as applied to an electrically operated refrigerating unit comprising generally a compressor 10 and an electric motor 11 for actuating the compressor. The latter is preferably of conventional design having a cylinder 12 for receiving the fluid to be compressed and a piston 13 for compressing the fluid. The piston is operatively connected in any suitable manner to one end of a connecting rod 14 having the opposite end engaging an eccentric 15 on the driven shaft 16 which in turn is operatively connected to the motor rotor hub 17 in a manner to be more fully hereinafter described.

As previously set forth, the present invention contemplates the provision of power transmitting mechanism 18 automatically operable to gradually apply the load to the prime mover after the latter has attained substantially maximum speed, thereby permitting the use of a prime mover having a relatively low starting torque and otherwise increasing the efficiency of the mechanism. In detail, the power transmitting mechanism 18, illustrated in Figure 1 for accomplishing the above results, comprises a gear 19 secured to one end of the driven shaft 16 and adapted to mesh with a pair of planet gears 20 and 21 arranged upon diametrically opposite sides of the gear 19. The planet gears 20 and 21 are journaled upon suitable shafts 22 which in turn are fixed in the outer ends of a pair of arms 23 formed integral with the hub 17 and extending radially outwardly from diametrically opposite sides of the latter shaft. The arrangement is such that the axes of rotation of the planet gears are definitely fixed relative to each other and to the fixed axis of rotation of the central gear 19 with the result that the planet gears are permitted to rotate around the central gear 19 in a fixed orbit.

Journaled upon the shafts 22 and rigidly secured to the planet gears 20 and 21 are suitable weights 24 and 25, respectively, having the centers of gravity 26 thereof disposed radially outwardly from the axes of the planet gears. The disposition of the weights 24 and 25 is such that when the mechanism is in driving position, as shown in Figure 2, the centers of gravity, axes of the planet gears and axis of rotation of the central gear 19 are in alignment with each other with the result that the weights and respective planet gears have a flywheel effect and are always in balance. In addition to the foregoing, it will be apparent from my improved construction, as outlined above, that maximum centrifugal force is obtained since the planet gears and accordingly the weights carried thereby are directly connected to the driving member and as a consequence, are rotated at exactly motor speed.

Referring now to the operation of the power transmitting mechanism 18, as outlined above, it will be observed that upon initially starting the motor, the resistance offered to the rotation of the driven shaft by the load will tend to maintain the central gear stationary causing the planet gears and weights, carried by the drive shaft, to rotate around the gear 19. As the speed of the hub 17 increases, the angular velocity of the weights about the axis of the gear 19 correspondingly increases and since the centers of gravity of the weights 24 and 25 are spaced a considerable distance radially outwardly from the fixed axis of rotation of the gear 19, centrifugal force will be set up tending to maintain the weights in the positions illustrated in Figure 2. The weights 24 and 25 are maintained substantially in the positions illustrated in Figure 2 when the centrifugal force is sufficient to overcome the resistance offered to the rotation of the central gear 19 at which time rotation of the planet gears around the gear 19 will be prevented and as a result, the latter gear will be driven by the said planet gears.

Assuming now that the drive and driven shafts are rotating at normal speed and for some reason the load on the driven shaft is increased, it will be seen that the weights 24 and 25 will lag or tend to move inwardly from their positions as shown in Figure 2 to maintain equality with the torque required to drive the load. In the event the torque is too great for the particular design or proportion of the parts used, the planet gears will begin to move relative to the central gear 19 so as to relieve the prime mover from a portion of the load. This operation continues until the power required to drive the driven shaft is equal to the motor power, assuming that the latter is constant. Thus, from the above it will be seen that with my improved power transmitting mechanism, the torque is always equal to the full motor power at any particular speed and for this reason the mechanism 18 may also be used with efficiency as a torque limiting device.

In some cases, including the particular application disclosed herein, the torque required to drive the load is not necessarily uniform throughout each revolution. For example, in the present instance, the torque required during the compression stroke of the pump is considerably greater than the torque required during the intake stroke. This non-uniformity of load under ordinary circumstances would tend to impart a slight oscillatory motion to the planet gears and weights if it were not for the fact that the momentum of the latter elements impart a flywheel effect tending to compensate for the variations in load. In this connection it is to be noted that since the centers of gravity of the weights 24 and 25 assume a definite position relative to the axes of the planet gears, the centrifugal force set up by the weights will function only upon movement toward the center gear 19 to impart a driving impulse to the latter. In other words, during rotation of the planet gears relative to the center gear 19, the weights function only throughout substantially 180° of the travel to impart a driving impulse to the center gear. This is not objectionable in the present instance, however, since rotation of the weights away from the center gear assists acceleration of the motor.

While in describing the present invention particular stress has been placed upon the association of the same in connection with refrigerating units for operatively connecting the prime mover to the compressor, it is to be noted that the same may be used in connection with numerous other types of apparatus for performing a similar function. It should also be understod from the foregoing that the present invention may be used with equal facility for performing different functions. For example, the same may be utilized as a torque limiting device, as pointed out above, or as a torsional vibration damper and a shock absorber since the connection between the driving and driven elements is an elastic one permitting relative movement thereof.

What I claim as my invention is:

1. An article of manufacture comprising a housing of substantially tubular formation having a transversely extending web provided with a tubular portion constituting a bearing, a compressor shaft journaled in the bearing, a split phase motor within the housing and having a rotor hub rotatable freely on said shaft and substantially abutting the bearing, and means substantially free from friction for transmitting motion positively from the rotor hub to said shaft at a one to one ratio after the rotor hub has accelerated from zero speed to a predetermined speed less than the normal running speed thereof, comprising only a sun gear fixed directly to said shaft and rotatable planet gears carried by the rotor hub and meshing with the sun gear, said planet gears being individually unbalanced but arranged symmetrically with respect to the axis of the shaft so that the gearing as a whole is always in balance.

2. An article of manufacture comprising a housing of substantially tubular formation having a transversely extending web provided with a tubular portion constituting a bearing, a shaft journalled in said bearing, a split phase motor within the housing and having a rotor hub rotatable freely on said shaft and substantially abutting the bearing, and means substantially free from friction for transmitting motion positively from the rotor hub to said shaft at a one to one ratio after the rotor hub has accelerated from zero speed to a predetermined speed less than the normal running speed thereof, comprising only a sun gear fixed directly to said shaft, rotatable planet gears carried by the rotor hub and meshing with the sun gear, and weights rigidly secured to the planet gears and arranged symmetrically with respect to the axis of the shaft so that the gearing as a whole is always in balance.

3. In combination, a driven shaft, a bearing for said shaft, a split phase motor having a rotor rotatable about said shaft and substantially abutting the bearing, and a driving connection between the rotor and shaft capable of permitting the rotor to rotate freely relative to the shaft from zero speed to a speed less than the normal running speed of the rotor, but operable after the rotor assumes the aforesaid speed below normal, to drive the shaft in unison therewith, comprising rotatable planet gears carried by the rotor, and a sun gear meshing with the planet gears and fixed directly to the shaft, whereby the sun gear will be driven positively and substantially free of friction by the planet gears, and the motion imparted to said sun gear from the planet gears will be transmitted directly and positively to said shaft, said planet gears being individually unbalanced but arranged symmetrically with respect to the axis of the shaft so that the gearing as a whole is always in balance.

In testimony whereof I affix my signature.

HAROLD A. GREENWALD.